(12) United States Patent
Priel et al.

(10) Patent No.: US 7,793,021 B2
(45) Date of Patent: Sep. 7, 2010

(54) METHOD FOR SYNCHRONIZING A TRANSMISSION OF INFORMATION AND A DEVICE HAVING SYNCHRONIZING CAPABILITIES

(75) Inventors: Michael Priel, Hertzelia (IL); Dan Kuzmin, Givat Shmuel (IL); Amir Zaltzman, Moshav Amikam (IL)

(73) Assignee: Freescale Semiconductor, Inc., Austin, TX (US)

( * ) Notice: Subject to any disclaimer, the term of this patent is extended or adjusted under 35 U.S.C. 154(b) by 68 days.

(21) Appl. No.: 12/160,005

(22) PCT Filed: Jan. 5, 2006

(86) PCT No.: PCT/IB2006/050047

§ 371 (c)(1),
(2), (4) Date: Jul. 3, 2008

(87) PCT Pub. No.: WO2007/077497

PCT Pub. Date: Jul. 12, 2007

(65) Prior Publication Data

US 2008/0307133 A1 Dec. 11, 2008

(51) Int. Cl.
*G06F 13/42* (2006.01)
*G06F 13/36* (2006.01)

(52) U.S. Cl. .......... 710/106; 710/61; 710/100; 710/305; 709/248; 714/12; 370/503; 713/401; 375/358

(58) Field of Classification Search ............ 710/61, 710/106; 713/401; 375/358; 709/248; 714/12; 370/503
See application file for complete search history.

(56) References Cited

U.S. PATENT DOCUMENTS

| 4,011,465 | A |   | 3/1977 | Alvarez, Jr. |
| 6,055,285 | A | * | 4/2000 | Alston ..................... 375/372 |
| 6,075,830 | A | * | 6/2000 | Piirainen .................. 375/354 |
| 6,292,521 | B1 |  | 9/2001 | Lai et al. |
| 6,636,907 | B1 |  | 10/2003 | Gaillard et al. |

(Continued)

FOREIGN PATENT DOCUMENTS

WO 9641267 A1 12/1996

(Continued)

*Primary Examiner*—Mark Rinehart
*Assistant Examiner*—Brian T Misiura
(74) *Attorney, Agent, or Firm*—Reches Patents

(57) ABSTRACT

A method for synchronizing a transmission of information over a bus, and a device having synchronization capabilities. The device includes: a bus that includes multiple bus lines, a bus transmitter connected between an information source and the bus, a bus receiver connected between the bus and an information target; wherein the information source and the information target are mutually asynchronous; wherein the device is characterized by including a bus receiver control circuit that controls the bus receiver circuit and a bus transmitter control circuit that controls the bus transmitter circuit; wherein the bus transmitter control circuit enables to transmit information from the information source to the bus in response to a change in a value of a feedback signal sent from the bus receiver control circuit and wherein the bus receiver control circuit enables to provide information from the bus to the information target in response to a change in a value of a delayed strobe signal provided by a delay unit connected between the bus receiver control circuit and the bus transmitter control circuit.

12 Claims, 7 Drawing Sheets

U.S. PATENT DOCUMENTS 6,744,285 B2 * 6/2004 Mangum et al. ............... 326/96
7,161,999 B2 * 1/2007 Parikh ........................ 375/354
7,543,172 B2 * 6/2009 Kizer et al. .................. 713/401
7,605,631 B2 * 10/2009 LaBerge ..................... 327/291

2004/0066879 A1 4/2004 Machida

FOREIGN PATENT DOCUMENTS

WO 2005002129 A1 1/2005

* cited by examiner

US 7,793,021 B2

METHOD FOR SYNCHRONIZING A TRANSMISSION OF INFORMATION AND A DEVICE HAVING SYNCHRONIZING CAPABILITIES

FIELD OF THE INVENTION

The present invention relates to devices having synchronizing capabilities and to methods for synchronizing a transmission of information.

BACKGROUND OF THE INVENTION

Modern integrated circuits include a vast amount of synchronized components such as processors, memory units, logic gates, flip-flops, peripherals, and the like. In many cases different components receive different clock signals that are not synchronized to each other. This can result, for example, from one of the following reasons: (i) different synchronized components operate at different frequencies, (ii) modern power reduction techniques involve partitioning the integrated circuit to multiple frequency domains and altering the clock signals provided to each frequency domain, (iii) clock distribution networks and clock generators have a limited capability to provide strong and balanced clock signals to many synchronized components.

The various synchronized components can be connected to each other by lines and even buses. Proper reception of information that is conveyed over such buses requires to synchronize the transmission and reception of information over the buses. The following patents and patent applications, all being incorporated herein by reference, illustrate some synchronizing methods: PCT patent application international publication number WO 96/41267° F. Mote, U.S. Pat. No. 6,636,907 of Gaillard et al., U.S. Pat. No. 4,011,465 of Alvarez, and U.S. patent application publication number 2004/0066879 of Gabara.

Various prior art methods and devices are characterized by a long synchronization period. There is a need to provide an efficient device having synchronizing capabilities and an efficient method for synchronizing a transmission of information over a bus.

SUMMARY OF THE PRESENT INVENTION

A device having synchronizing capabilities and a method for synchronizing a transmission of information over a bus, as described in the accompanying claims.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

Figure 1:
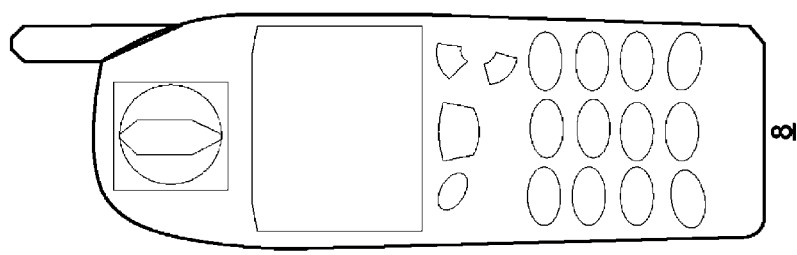
FIG. 1 illustrates a device, according to an embodiment of the invention.

The following figures illustrate exemplary embodiments of the invention. They are not intended to limit the scope of the invention but rather assist in understanding some of the embodiments of the invention. It is further noted that all the figures are out of scale.

According to an embodiment of an invention an efficient synchronization method and device are provided. The transmission of information over a bus and a provision of the transmitted information to an information target are synchronized by exchanging control signals and tracking after changes in values of the control signals. Conveniently, the control signals include a strobe signal that is delayed in accordance to a delay introduced by an information conveying bus.

According to an embodiment of the invention new information can transmitted every bus receiver circuit clock cycle or every two bus receiver circuit clock cycles, in response to a relationship between a frequencies of the bus receiver circuit clock and a bus transmitter circuit clock.

According to an embodiment of the invention a device is provided. The device includes: a bus that includes multiple bus lines, a bus transmitter connected between an information source and the bus, a bus receiver connected between the bus and an information target; whereas the information source and the information target are mutually asynchronous; whereas the device is characterized by including a bus receiver control circuit that controls the bus receiver circuit and a bus transmitter control circuit that controls the bus transmitter circuit; whereas the bus transmitter control circuit enables to transmit information from the information source to the bus in response to a change in a value of a feedback signal sent from the bus receiver control circuit and whereas the bus receiver control circuit enables to provide information from the bus to the information target in response to a change in a value of a delayed strobe signal provided by a delay unit connected between the bus receiver control circuit and the bus transmitter control circuit.

According to an embodiment of the invention a method is provided. The method includes receiving, by a bus transmitter circuit that is controlled by a bus transmitter control circuit, information provided by an information source, transmitting, by the bus transmitter circuit to a bus receiver circuit controlled by a bus receiver control circuit, the information over the bus, and providing, by the bus receiver circuit, the transmitted information to an information target; whereas the information source and the information target are mutually asynchronous; whereas the method is characterized by including: monitoring a value of a feedback signal provided to the bus transmitter control circuit by the bus receiver control circuit; and selectively enabling, by the bus transmitter control circuit, the transmitting of information in response to a change in a value of the feedback signal; monitoring a value of a delayed strobe signal provided to the bus receiver control circuit by a delay unit and selectively enabling the providing of the transmitted information to the information target in response to a change in a value of the delayed strobe signal.

FIG. 1 illustrated a device 8, according to an embodiment of the invention. FIG. 1 illustrates a mobile phone 8. It is noted that device 8 can differ from a mobile phone. Device 8 can be an integrated circuit, a system on chip, a mobile device other than a mobile phone, can be a personal data accessory, a computer, and the like.

Figure 2:
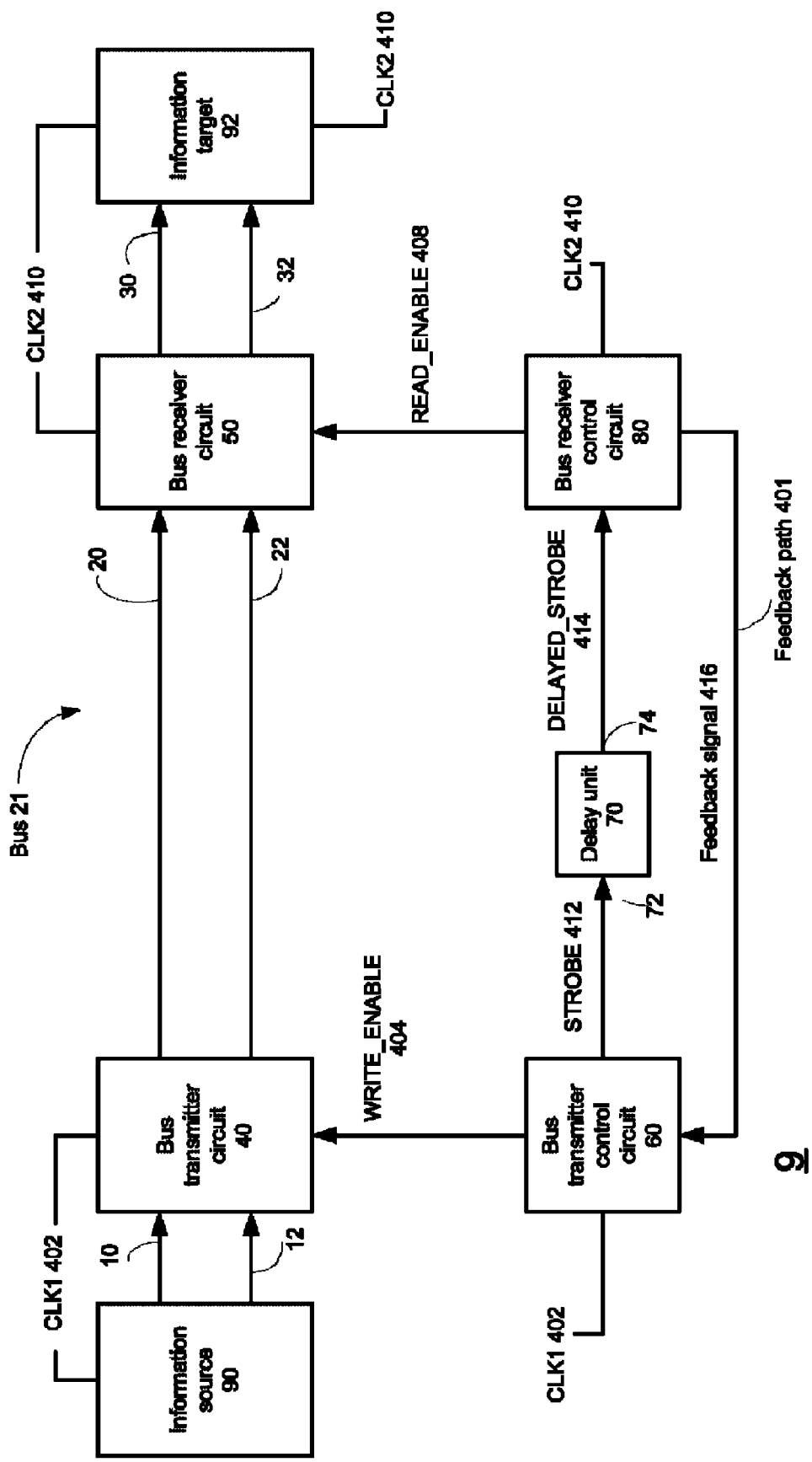
FIG. 2 illustrates a portion of a device, according to an embodiment of the invention.

FIG. 2 illustrates portion 9 of a device 8, according to an embodiment of the invention.

FIGS. 2-5 illustrate only two bus lines, although the number of bus lines can exceed two lines. Typically, each but line is associated with a bus reception path and a bus transmission path.

Two input lines 10 and 12 are connected between an information source 90 and a bus transmitter circuit 40. The bus transmitter circuit 40 is connected to bus lines 20 and 22. The two bus lines 20 and 22 are connected to a bus receiver circuit 50. The bus receiver circuit 50 is also connected via output lines 30 and 32 to information target 92.

The information source 90 and the information target 92 can be a bus, a memory component, a logic component, a flip-flop, a register, a FIFO memory unit, and the like. The information source 90 can generate the information or receive it from another component. The information target 92 can provide the information to another component, can modify the information and the like.

Bus transmitter circuit 40 is controller by bus transmitter control circuit 60, while bus receiver circuit 50 is controlled by bus receiver control circuit 80. Bus transmitter control circuit 60 sends to bus receiver control circuit 80, via delay unit 70, a strobe signal (STROBE) 412.

Bus transmitter circuit 40 and bus transmitter control circuit 60 are clocked by first clock signal CLK1 402. Bus receiver circuit 50 and bus receiver control circuit 80 are clocked by second clock signal CLK2 410. CLK2 410 and CLK1 402 are not synchronized to each other, thus the frequencies and phase of these clock signals have no fixed relationships.

The delay unit 70 has a delay that substantially equals or slightly exceeds the maximal delay period introduced by a bus line out of bus lines 20 and 22.

The delay unit 70 is placed such that when a delayed strobe signal (DELAYED_STROBE) 414 from bus receiver control circuit 60 reaches the bus transmitter control circuit 80 all the information that propagate over bus lines 20 and 22 have reached the bus transmitter circuit 40.

Delay unit 70 can include logic components such as but not limited to inverters, but this is not necessarily so. The delay unit 70 can also include a conductor that introduces the required delay period.

Bus transmitter control circuit 80 sends to bus receiver control circuit 60, a feedback signal 416. The bus transmitter control circuit 80 monitors the feedback signal 416 and in response to a change in the value of the feedback signal 416 generates a write enable signal (WRITE_ENABLE) 404. WRITE_ENABLE 404 indicates that the bus transmitter circuit 40 can transmit information over bus lines 20 and 22. It is noted that the feedback signal is also delayed but for simplicity of explanation the delay introduced by the feedback path 401 is ignored.

The bus receiver control circuit 80 monitors DELAYED_STROBE 414 and in response to a change in the value of DELAYED_STROBE 414 generates a read enable signal (READ_ENABLE) 408 that indicates that the bus receiver circuit 50 can receive information over bus lines 20 and 22.

Figure 3:
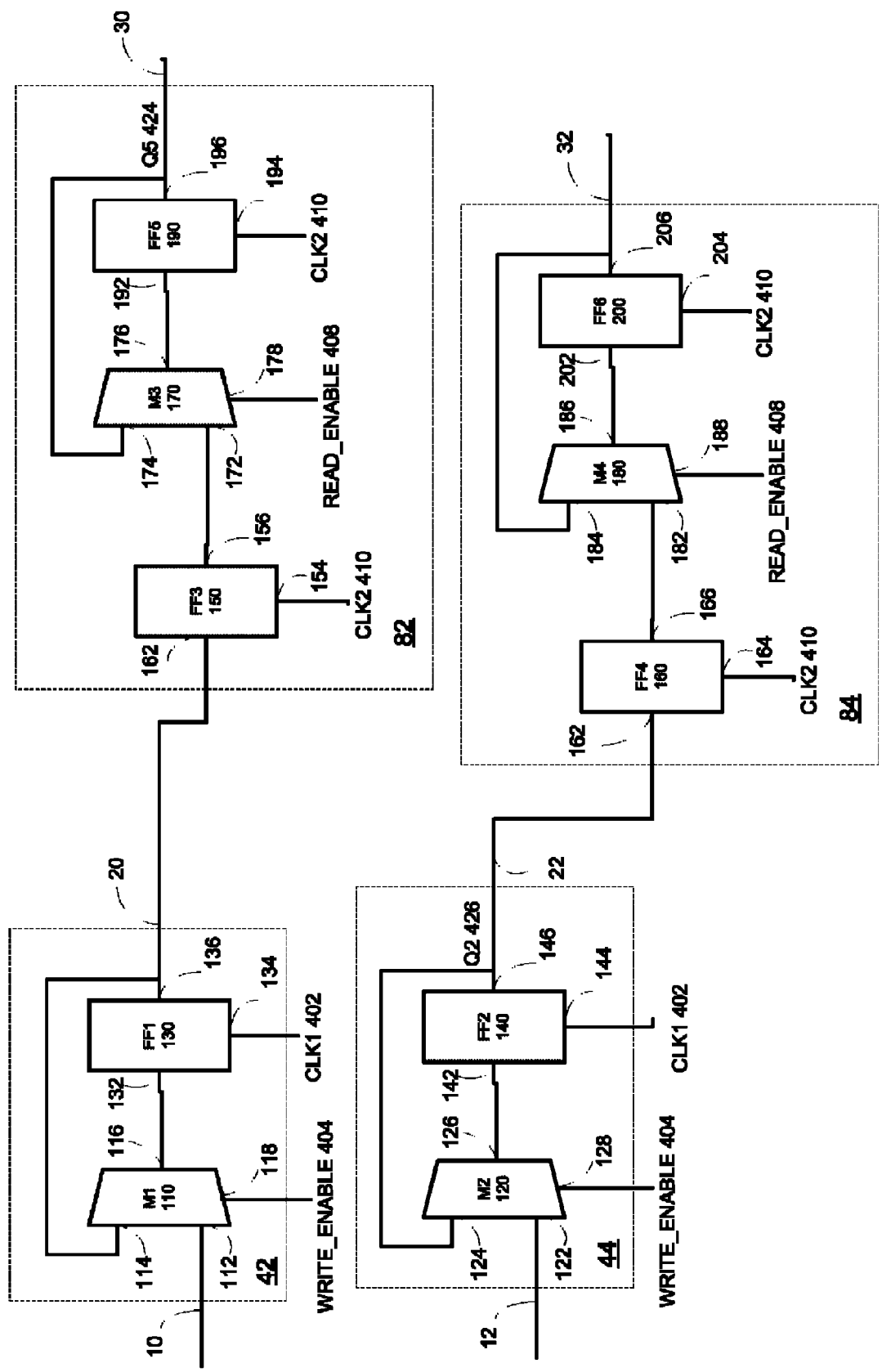
FIG. 3 illustrates a bus receiver circuit and a bus transmitter circuit, according to an embodiment of the invention.
Figure 4:
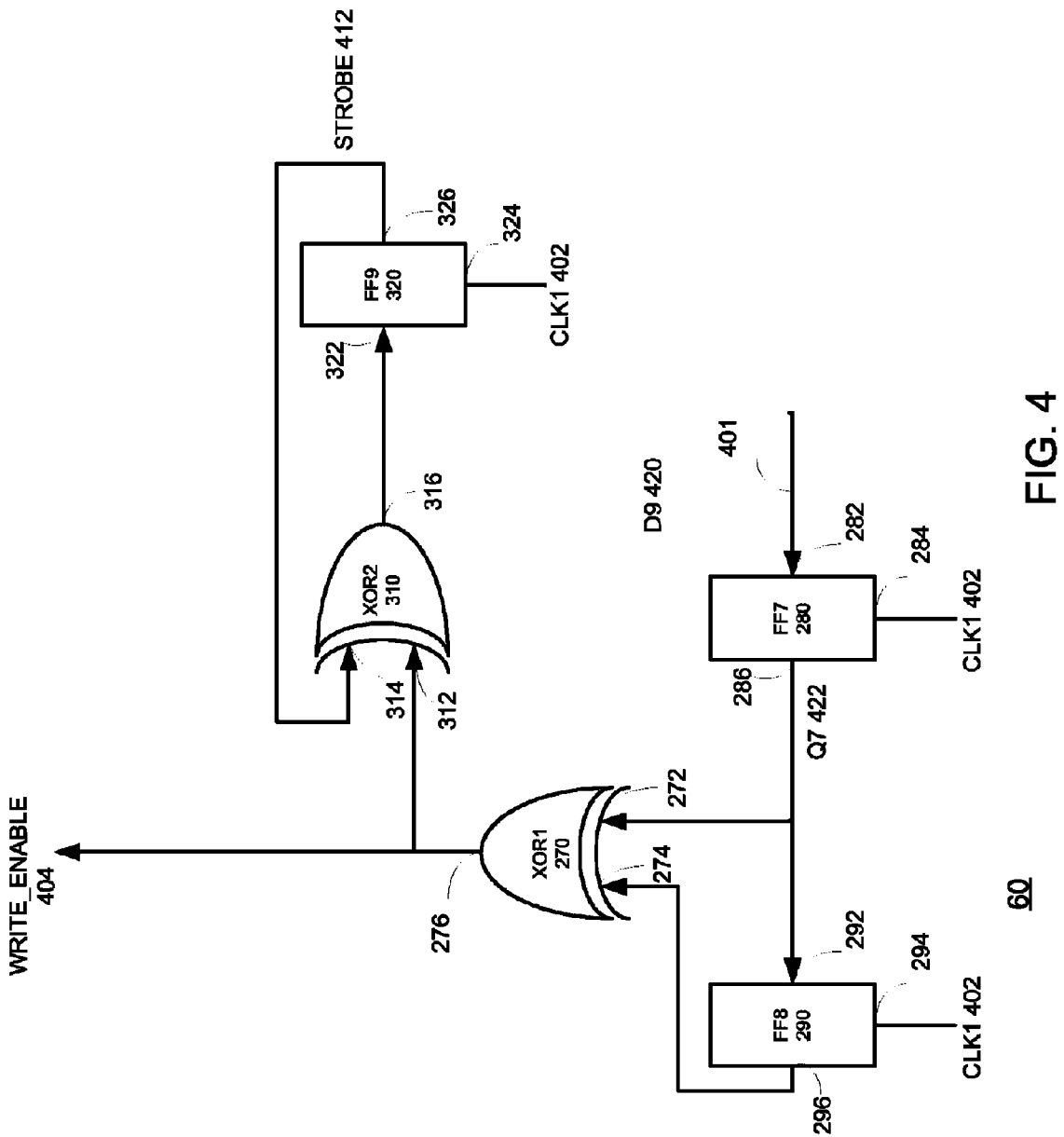
FIG. 4 illustrates a bus transmitter control circuit, according to an embodiment of the invention.
Figure 5:
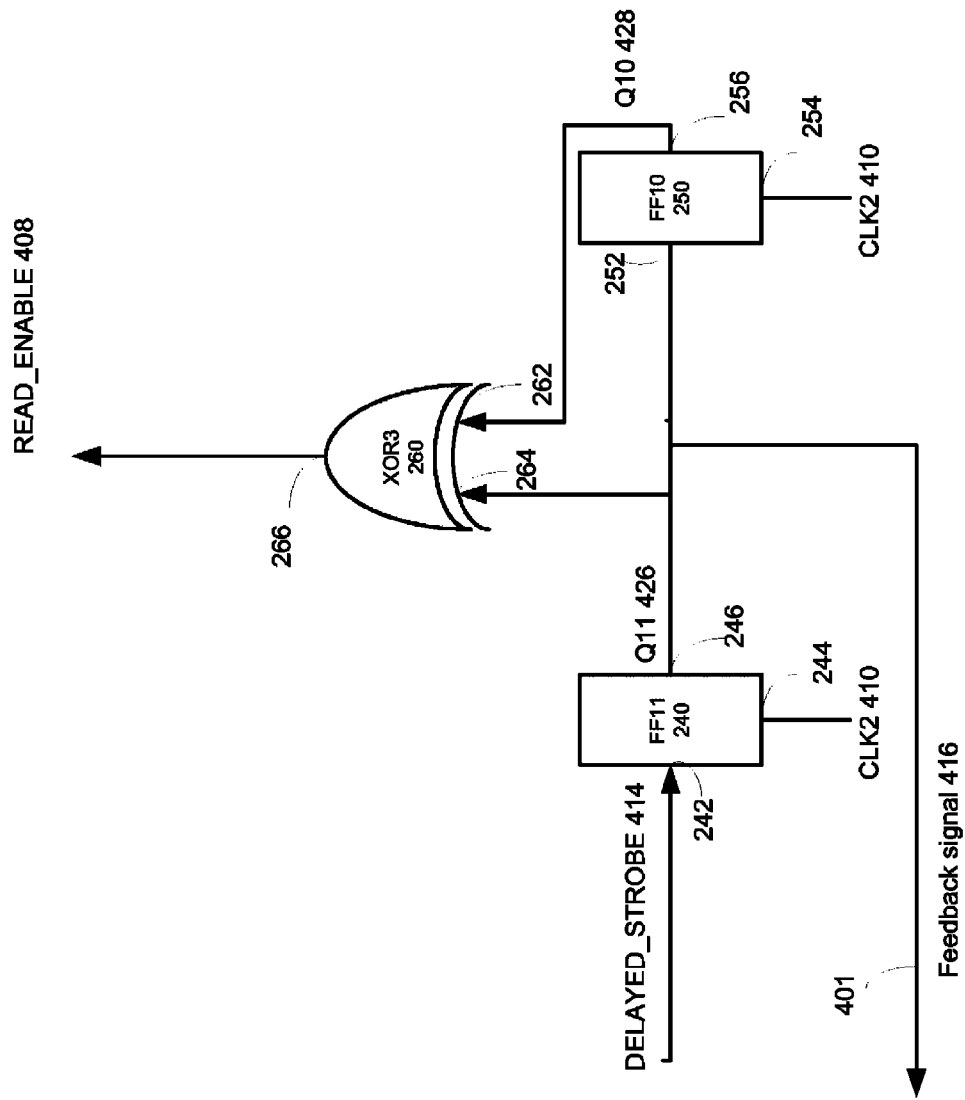
FIG. 5 illustrates a bus receiver control circuit, according to an embodiment of the invention.

FIG. 3 illustrates a bus receiver circuit 40 and a bus transmitter circuit 50, according to an embodiment of the invention. FIG. 4 illustrates a bus transmitter control circuit 60, according to an embodiment of the invention. FIG. 5 illustrates a bus receiver control circuit 80, according to an embodiment of the invention.

Conveniently, bus transmitter circuit 40 includes a bus transmitter path for each input line. FIG. 3 illustrates two input lines, thus bus transmitter circuit 40 includes two bus transmitter paths 42 and 44.

Referring to FIG. 3, first bus transmitter path 42 includes a first multiplexer M 110 and a first flip-flop FF1 130. A first input 112 of first multiplexer 110 is connected to first input line 10. A second input 114 of first multiplexer 110 is connected to an output 136 of first flip-flop 130. An input 132 of first flip-flop 130 is connected to an output 116 of first multiplexer 110. The first flip-flop 130 is clocked, via clock input 134, by CLK1 402. The first multiplexer 110 includes a control input 118 that receives WRITE_ENABLE 404 as a control signal.

Signal WRITE_ENABLE 404 is generated by bus transmitter control logic 60 and it indicates when new information can be transmitted by the first and second bus transmitter paths 42 and 44. When such new information should be transmitted WRITE_ENABLE 404 is set thus causing the first multiplexer 110 to select its first input 112. The first multiplexer 110 outputs the information provided by first input bus 10 to the first flip-flop 130. The first flip-flop 130 outputs this information to the first bus line 20. Until such new information can be provided WRITE_ENABLE 404 is reset, thus causing the first multiplexer 110 to select its second input 114. Thus, the pervious value of the first bus line 20 is provided, via the second input 114 of first multiplexer 110 to the first flip-flop 130. First flip-flop 130 outputs that old value.

It is noted that the value of WRITE_ENABLE 404 can also be reset in order to select the first input 112 of the first multiplexer 110 and to be set in order to select the second input 114 of the first multiplexer 110.

Second bus transmitter path 44 includes a second multiplexer M2 120 and a second flip-flop FF2 140. A first input 122 of second multiplexer 120 is connected to second input line 10. A first input 112 of second multiplexer 120 is connected to an output 146 of second flip-flop 140. An input 142 of second flip-flop 140 is connected to an output 126 of second multiplexer 120. The second flip-flop 140 is clocked, via clock input 144, by CLK2 410. The second multiplexer 120 includes a control input 128 that receives WRITE_ENABLE 404 as a control signal.

When WRITE_ENABLE 404 is set the second multiplexer 120 selects its first input 122. The second multiplexer 120 outputs the information provided by second input bus 12 to the second flip-flop 140. The second flip-flop 140 outputs this information to the second bus line 22. Until such new information can be provided WRITE_ENABLE 404 is reset, thus causing the second multiplexer 120 to select its second input 124. Thus, the pervious value of the second bus line 22 is provided, via the second input 124 of second multiplexer 120 to the second flip-flop 140.

Bus receiver circuit 50 includes a bus receiver path for each input line. FIG. 1 illustrates two input lines, thus bus receiver circuit 50 includes two bus receiver paths 52 and 54.

First bus receiver path 52 includes a third flip-flop FF3 150, a third multiplexer M2 170 and a fifth flip-flop F5 190. A first input 152 of third flip-flop 150 is connected to first bus line 20. An output 156 of third flip-flop 150 is connected to a first input 172 of third multiplexer 170. A second input 174 of third multiplexer 170 is connected to an output 196 of fifth flip-flop 190. An input 192 of fifth flip-flop 190 is connected to an output 176 of third multiplexer 170. The third and fifth flip-flops 170 and 190 are clocked, via respective clock inputs 174 and 194, by CLK2 410. The third multiplexer 170 includes a control input 178 that receives READ_ENABLE 408 as a control signal.

Signal READ_ENABLE 408 is generated by bus receiver control logic 80 and it indicates when new information can be provided to the first and second output lines 30 and 32. When such new information should be provided READ_ENABLE 408 is set thus causing the third multiplexer 170 to select its first input 172. The third multiplexer 170 outputs the information provided by third flip-flop 150 to the fifth flip-flop 190. The fifth flip-flop 190 outputs this information to the first output line 30. Until such new information can be provided READ_ENABLE 408 is reset, thus causing the third multiplexer 170 to select its second input 174. Thus, the pervious value of the first output line 30 is provided, via the second input 174 of third multiplexer 170 to the fifth flip-flop 190. Fifth flip-flop 190 outputs that old value.

It is noted that the value of READ_ENABLE 408 can also be reset in order to select the first input 172 of the third multiplexer 170 and to be set in order to select the second input 174 of the third multiplexer 170.

Second bus receiver path 84 includes a fourth flip-flop FF4 160, a fourth multiplexer M4 180 and a sixth flip-flop FF6 200. A first input 162 of fourth flip-flop 160 is connected to second bus line 22. An output 166 of fourth flip-flop 160 is connected to a first input 182 of fourth multiplexer 180. A second input 184 of fourth multiplexer 180 is connected to an output 206 of sixth flip-flop 200. An input 202 of sixth flip-flop 200 is connected to an output 186 of fourth multiplexer 180. The fourth and sixth flip-flops 180 and 200 are clocked, via respective clock inputs 184 and 204, by CLK2 410. The fourth multiplexer 180 includes a control input 188 that receives READ_ENABLE 508 as a control signal.

When READ_ENABLE 408 is set the fourth multiplexer 180 selects its first input 182. The fourth multiplexer 180 outputs the information provided by fourth flip-flop 160 to the sixth flip-flop 200. The sixth flip-flop 200 outputs this information to the second output line 32.

Until such new information can be provided READ_EN-ABLE 408 is reset, thus causing the fourth multiplexer 180 to select its second input 184. Thus, the pervious value of the second output line 32 is provided, via the second input 184 of fourth multiplexer 180 to the sixth flip-flop 200. Sixth flip-flop 200 outputs that old value.

While READ_ENABLE 408 is reset the bus receiver circuit 50 samples (by third and fourth flip-flops 150 and 160) the first and second bus lines 20 and 22 but does not send the sampled values over output buses 30 and 32. Only if READ_ENABLE 408 is set the information conveyed over the first and second bus lines 20 and 22 propagates through the bus receiver circuit 50 and arrives to the first and second output lines 30 and 32.

Referring to FIG. 4, bus transmitter control circuit 60 includes a seventh flip-flop FF7 280, an eighth flip-flop FF8 290, a ninth flip-flip FF9 320, a first XOR gate 270 and a second XOR gate 310. Flip-flops 290, 280 and 320 are clocked by CLK1 402.

An input 282 of seventh flip-flop 280 is connected to the feedback path 401 to receive the feedback signal 416. An output 286 of seventh flip-flop 280 is connected to a first input 272 of first XOR gate XOR1 270 and to an input 292 of the eighth flip-flop 290. The output 294 of the eighth flip-flop 290 is connected to a second input 274 of the first XOR gate 270. The output 276 of the first XOR gate 270 provides WRITE_ENABLE 404 to the control inputs 118 and 128 of first and second multiplexers 110 and 120. In addition, the output 276 of the first XOR gate 270 is also connected to a first input 312 of second XOR gate XOR2 310. The output 316 of the second XOR gate 310 is connected to an input 322 of the ninth flip-flop 320. The output 326 of the ninth flip-flop 320 is connected to a second input 314 of the second XOR gate 310 and to an input 72 of the delay unit 70. The signal outputted from the ninth flip-flop 320 is STROBE 412. The signal outputted from output 74 of delay unit 70 is DELAYED_STROBE 414.

The first XOR gate 270 sets WRITE_ENABLE 404 when it detects a change between a current value of feedback signal 416 and a previous value of feedback signal 416. The second XOR gate 310 sets STROBE 412 when it detects a change between a current value of WRITE_ENABLE 404 and a previous value of STROBE 412.

Referring to FIG. 5, bus receiver control circuit 80 includes a tenth flip-flop FF10 250, an eleventh flip-flop FF11 240, and a third XOR gate 260. Flip-flops 250 and 240 are clocked by CLK2 410.

According to an embodiment of the invention the eleventh flip-flop 240 and the seventh flip-flop 280 are spike-less flip-flops. It is noted that other flip-flops, and especially flip-flips that belong to the bus receiver control circuit 80 and bus transmitter control circuit 60 can be spike-less flip-flops.

An input 242 of eleventh flip-flop FF11 240 is connected to the output 24 of delay unit 70 to receive DELAYED_STROBE 414. An output 244 of FF11 240 is connected to a first input 262 of third XOR gate (XOR3) 260 and to an input 252 of the tenth flip-flop 250. The output 254 of the tenth flip-flop 250 is connected to a second input 264 of the third XOR gate 260. The output 266 of the third XOR gate 260 provides READ_ENABLE 408 to the control inputs 178 and 188 of third and fourth multiplexers 170 and 180. The signal outputted from the tenth flip-flop 250 is the feedback signal 416.

The third XOR gate 260 sets READ_ENABLE 404 when it detects a change between a current value of DELAYED_STROBE 414 and a previous value of DELAYED_STROBE 414 feedback signal 416.

Figure 6:
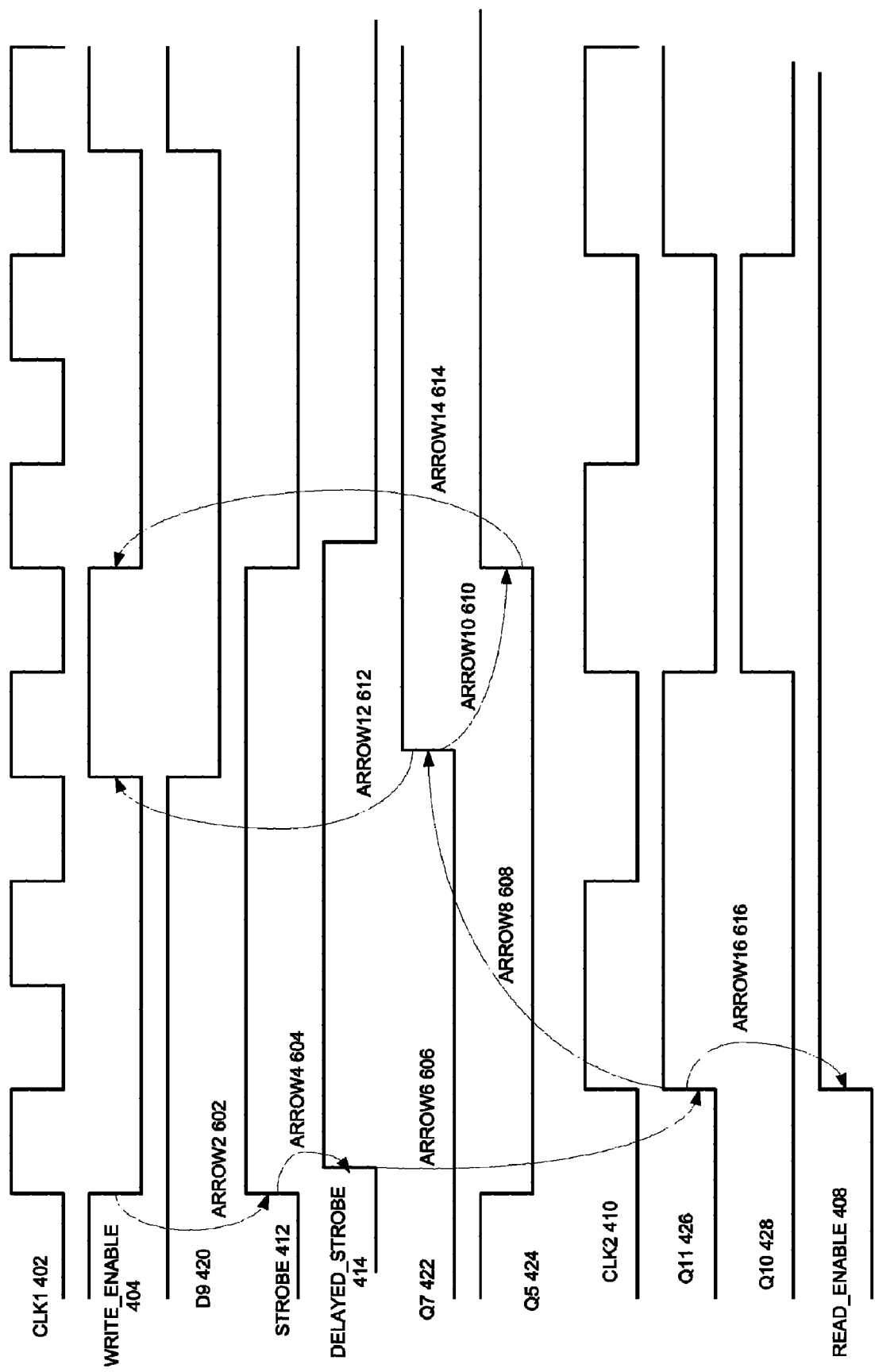
FIG. 6 is a timing diagram illustrating various signals, according to an embodiment of the invention.

FIG. 6 is a timing diagram 600 illustrating various signals, according to an embodiment of the invention.

The illustrated signals include: CLK1 402, WRITE_EN-ABLE 404, D9 420 (the input signal to FF9 320), STROBE 412, DELAYED STROBE 414, Q7 422 (output data of FF7 280), Q5 424 (output data of FF5 290), CLK2 410, Q11 426 (output data of FF11 240), Q10 428 (output data of FF10 250) and READ_ENABLE 408.

Q7 422 is a delayed version (by one CK1 cycle) of feedback signal 416. Q5 424 is a delayed version (by two CK1 cycles) of feedback signal 416.

Q11 426 is a delayed version (by one CK2 cycle) of DELAYED_STROBE 414. Q10 428 is a delayed version (by two CK2 cycles) of DELAYED_STROBE 414.

FIG. 6 illustrates an exemplary scenario in which the period of CLK1 is about one half of the period of CLK2 410, and there is a certain phase difference between the two clocks.

The various arrows illustrate the relationship between various signals. ARROW2 602 illustrates that an assertion of WRITE_ENABLE 404 causes an assertion (change of value) of STROBE 412.

ARROW4 604 illustrates that an assertion of STROBE 412 causes an assertion (change of value), after a certain delay period, of DELAYED_STROBE 414.

ARROW6 606 illustrates that at the first rising edge of CLK2 410 after an assertion of DELAYED_STROBE 414 Q11 426 is asserted (changes value).

ARROW16 616 illustrates that an assertion of Q11 246 causes an assertion of READ_ENABLE 408.

ARROW8 608 illustrates that the rising edge of Q11 426 is followed by a rising edge of Q7 422.

ARROW12 612 illustrates that the rising edge of Q7 422 is followed by the rising edge of WRITE_ENABLE 404.

ARROW6 610 illustrates that at the first rising edge of CLK1 402 after an assertion of Q7 422 a rising edge of Q5 424 occurs.

ARROW6 614 illustrates that at the assertion of Q5 424 causes WRITE_ENABLE 404 to negate.

The inventors also simulated the performance of portion 9 by providing a CLK1 402 that had substantially the same frequency as CLK2 410 and new information was transmitted over the bus every second cycle of CLK1 402. Similar results were achieved when using CLK2 410 that is faster than CLK1 402.

Figure 7:
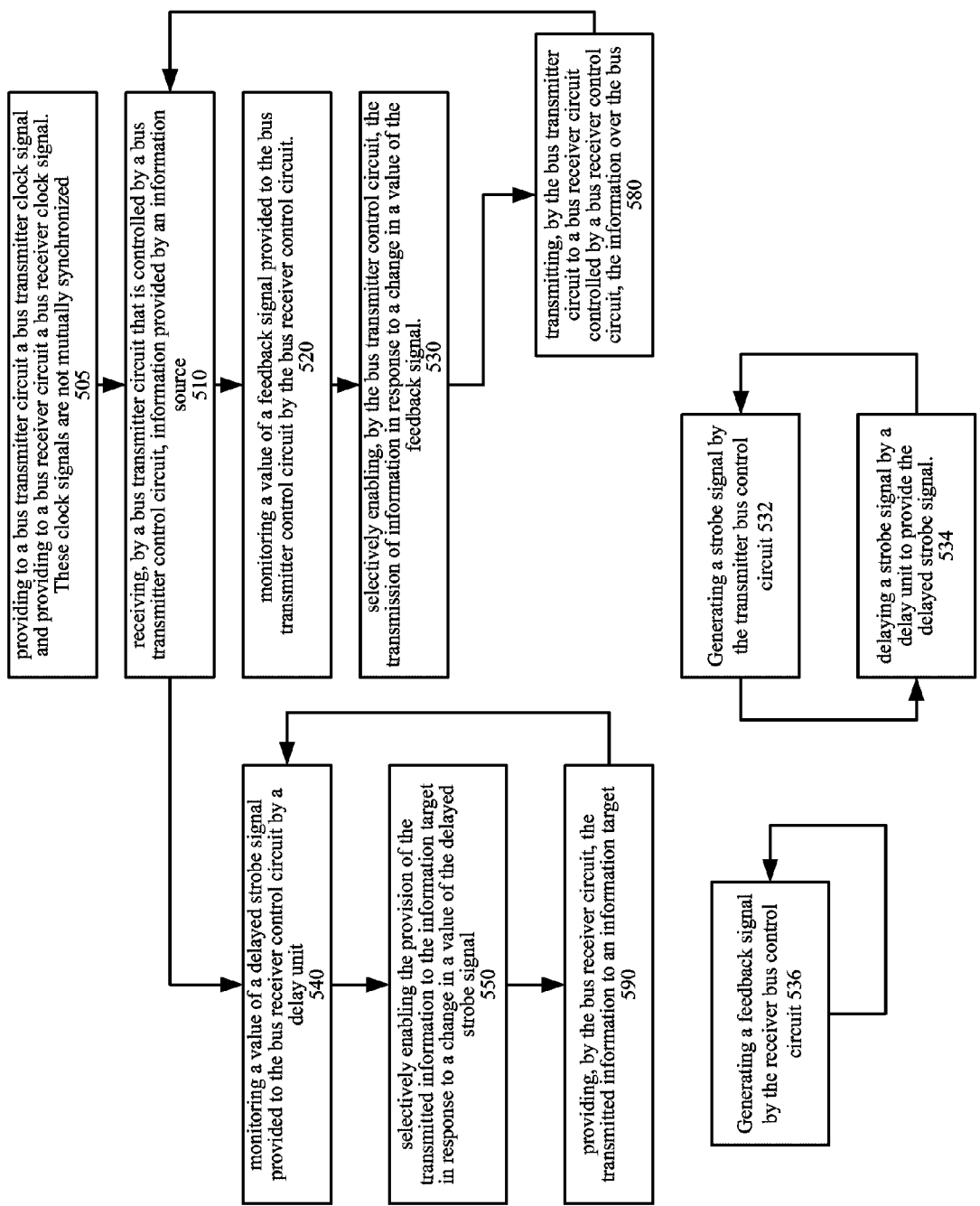
FIG. 7 is a flow chart of a method for synchronizing a transmission of information over a bus, according to an embodiment of the invention.

FIG. 7 is a flow chart of method 500 for synchronizing a transmission of information over a bus, according to an embodiment of the invention.

Method 500 starts by stage 505 of providing to a bus transmitter circuit a bus transmitter clock signal and providing to a bus receiver circuit a bus receiver clock signal. These clock signals are not mutually synchronized. Thus, components such as an information source and an information target that are fed by different clocks are mutually asynchronous. Referring to the example set forth in the previous figures, the bus transmitter clock signal is CLK1 402 while the bus receiver clock signal is CLK2 410.

Stage 505 is followed by stage 510 of receiving, by a bus transmitter circuit that is controlled by a bus transmitter control circuit, information provided by an information source.

Stage 510 is followed by stages 520 and 540. Stage 520 includes monitoring a value of a feedback signal provided to the bus transmitter control circuit by the bus receiver control circuit.

Stage 520 is followed by stage 530 of selectively enabling, by the bus transmitter control circuit, the transmission of information in response to a change in a value of the feedback signal.

Stage 530 is followed by stage 580 of transmitting, by the bus transmitter circuit to a bus receiver circuit controlled by a bus receiver control circuit, the information over the bus. Stage 580 is followed by stage 510.

Conveniently, the bus transmitter clock signal is faster than the bus receiver clock signal and stage 580 of transmitting includes transmitting new information every bus receiver clock cycle.

Conveniently, the bus transmitter clock signal and the bus receiver clock signal are characterized by substantially the same frequency and stage 580 of transmitting includes transmitting new information every two bus receiver clock cycles.

Stage 540 includes monitoring a value of a delayed strobe signal provided to the bus receiver control circuit by a delay unit. Conveniently, stage 540 of monitoring a value of a delayed strobe signal includes determining a value of a current strobe signal in response to a relationship between a value of a current write enable signal and a previous value of a strobe signal Stage 540 is followed by stage 550 of selectively enabling the provision of the transmitted information to the information target in response to a change in a value of the delayed strobe signal. Conveniently, the transmitting includes selecting to output to the bus new information from the information source instead of information previously provided to the bus.

Stage 550 is followed by stage 590 of providing, by the bus receiver circuit, the transmitted information to an information target. Stage 590 is followed by stage 540.

Method 500 further includes various stages 532-536 that are executed in parallel to stages 510-590. Stage 532 includes generating a strobe signal such as STROBE 412. Referring to the examples set forth in previous figures, the value of STROBE 412 changes when the current value of the WRITE_ENABLE 404 differs from previous value of STROBE 412. Stage 532 is followed by stage 534 of delaying STROBE 412 to provide DELAYED_STROBE 414. Stage 534 is followed by stage 532. Stage 536 includes generating a feedback signal such as feedback signal 416 that is sent from the bus receiver control circuit 80 to the bus transmitter control circuit 60.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A device comprising:
a bus that comprises multiple bus lines; a bus transmitter circuit coupled between an information source and the bus; a bus receiver circuit coupled between the bus and an information target; wherein the information source and the information target are mutually asynchronous; a bus receiver control circuit that controls the bus receiver circuit and a bus transmitter control circuit that controls the bus transmitter circuit; wherein the bus transmitter control circuit enables the bus transmitter circuit to transmit information from the information source to the bus in response to a change in a value of a feedback signal sent from the bus receiver control circuit; and wherein the bus receiver control circuit enables the bus receiver circuit to provide information from the bus to the information target in response to a change in a value of a delayed strobe signal provided by a delay unit coupled between the bus receiver control circuit and the bus transmitter control circuit; and
wherein the bus transmitter control circuit sends a strobe signal to a delay unit that provides a delayed strobe signal to the receiver control circuit; and wherein a delay period of the delay unit is substantially equal to a maximal delay period introduced by lines of the bus.

2. A device comprising:
a bus that comprises multiple bus lines; a bus transmitter circuit coupled between an information source and the bus; a bus receiver circuit coupled between the bus and an information target; wherein the information source and the information target are mutually asynchronous; a bus receiver control circuit that controls the bus receiver circuit and a bus transmitter control circuit that controls the bus transmitter circuit; wherein the bus transmitter control circuit enables the bus transmitter circuit to transmit information from the information source to the bus in response to a change in a value of a feedback signal sent from the bus receiver control circuit; wherein the bus receiver control circuit enables the bus receiver circuit to provide information from the bus to the information target in response to a change in a value of a delayed strobe signal provided by a delay unit coupled between the bus receiver control circuit and the bus transmitter control circuit; and
wherein the bus transmitter control circuit sends a strobe signal to a delay unit that provides a delayed strobe signal to the receiver control circuit; and wherein a delay period of the delay unit ranges between a maximal delay period introduced by lines of the bus and half of a bus transmitter circuit clock cycle.

3. A device comprising:

a bus that comprises multiple bus lines; a bus transmitter circuit coupled between an information source and the bus; a bus receiver circuit coupled between the bus and an information target; wherein the information source and the information target are mutually asynchronous; a bus receiver control circuit that controls the bus receiver circuit and a bus transmitter control circuit that controls the bus transmitter circuit; wherein the bus transmitter control circuit enables the bus transmitter circuit to transmit information from the information source to the bus in response to a change in a value of a feedback signal sent from the bus receiver control circuit; wherein the bus receiver control circuit enables the bus receiver circuit to provide information from the bus to the information target in response to a change in a value of a delayed strobe signal provided by a delay unit coupled between the bus receiver control circuit and the bus transmitter control circuit; and wherein the bus transmitter circuit comprises multiple multiplexers that select whether to send to the bus new information from the information source or information previously provided to the bus.

4. A device comprising:

a bus that comprises multiple bus lines; a bus transmitter circuit coupled between an information source and the bus; a bus receiver circuit coupled between the bus and an information target; wherein the information source and the information target are mutually asynchronous; a bus receiver control circuit that controls the bus receiver circuit and a bus transmitter control circuit that controls the bus transmitter circuit; wherein the bus transmitter control circuit enables the bus transmitter circuit to transmit information from the information source to the bus in response to a change in a value of a feedback signal sent from the bus receiver control circuit; wherein the bus receiver control circuit enables the bus receiver circuit to provide information from the bus to the information target in response to a change in a value of a delayed strobe signal provided by a delay unit coupled between the bus receiver control circuit and the bus transmitter control circuit; wherein the bus transmitter circuit receives a bus transmitter clock signal and wherein the bus receiver circuit receives a bus receiver clock signal; and wherein the bus transmitter clock signal is faster than the bus receiver clock signal and wherein each bus receiver clock cycle new information is transmitted over the bus.

5. A device comprising:

a bus that comprises multiple bus lines; a bus transmitter circuit coupled between an information source and the bus; a bus receiver circuit coupled between the bus and an information target; wherein the information source and the information target are mutually asynchronous; a bus receiver control circuit that controls the bus receiver circuit and a bus transmitter control circuit that controls the bus transmitter circuit; wherein the bus transmitter control circuit enables the bus transmitter circuit to transmit information from the information source to the bus in response to a change in a value of a feedback signal sent from the bus receiver control circuit; wherein the bus receiver control circuit enables the bus receiver circuit to provide information from the bus to the information target in response to a change in a value of a delayed strobe signal provided by a delay unit coupled between the bus receiver control circuit and the bus transmitter control circuit; wherein the bus transmitter circuit receives a bus transmitter clock signal and wherein the bus receiver circuit receives a bus receiver clock signal; and wherein the bus transmitter clock signal and the bus receiver clock signal are characterized by substantially the same frequency and wherein new information is transmitted over the bus every two bus receiver clock cycles.

6. A method for synchronizing a transmission of information over a bus, the method comprises:

receiving, by a bus transmitter circuit that is controlled by a bus transmitter control circuit, information provided by an information source, transmitting, by the bus transmitter circuit to a bus receiver circuit controlled by a bus receiver control circuit, the information over the bus, and providing, by the bus receiver circuit, the transmitted information to an information target; wherein the information source and the information target are mutually asynchronous; monitoring a value of a feedback signal provided to the bus transmitter control circuit by the bus receiver control circuit; selectively enabling, by the bus transmitter control circuit, the transmitting of information in response to a change in a value of the feedback signal; monitoring a value of a delayed strobe signal provided to the bus receiver control circuit by a delay unit and selectively enabling the providing of the transmitted information to the information target in response to a change in a value of the delayed strobe signal; and delaying a strobe signal by a delay unit to provide the delayed strobe signal;

wherein a delay period of the delay unit is substantially equal to a maximal delay period introduced by lines of the bus.

7. A method for synchronizing a transmission of information over a bus, the method comprises:

receiving, by a bus transmitter circuit that is controlled by a bus transmitter control circuit, information provided by an information source, transmitting, by the bus transmitter circuit to a bus receiver circuit controlled by a bus receiver control circuit, the information over the bus, and providing by the bus receiver circuit, the transmitted information to an information target; wherein the information source and the information target are mutually asynchronous; monitoring a value of a feedback signal provided to the bus transmitter control circuit by the bus receiver control circuit; selectively enabling, by the bus transmitter control circuit, the transmitting of information in response to a change in a value of the feedback signal; monitoring a value of a delayed strobe signal provided to the bus receiver control circuit by a delay unit and selectively enabling the providing of the transmitted information to the information target in response to a change in a value of the delayed strobe signal; and delaying a strobe signal by a delay unit to provide the delayed strobe signal; wherein a delay period of the delay unit ranges between a maximal delay period introduced by lines of the bus and half of a bus transmitter circuit clock cycle.

8. A method for synchronizing a transmission of information over a bus, the method comprises:

receiving, by a bus transmitter circuit that is controlled by a bus transmitter control circuit, information provided by an information source, transmitting, by the bus transmitter circuit to a bus receiver circuit controlled by a bus receiver control circuit, the information over the bus, and providing by the bus receiver circuit, the transmitted information to an information target; wherein the information source and the information target are mutually asynchronous; monitoring a value of a feedback signal provided to the bus transmitter control circuit by the bus receiver control circuit; selectively enabling, by the bus transmitter control circuit, the transmitting of information in response to a change in a value of the feedback signal; monitoring a value of a delayed strobe signal provided to the bus receiver control circuit by a delay unit and selectively enabling the providing of the transmitted information to the information target in response to a change in a value of the delayed strobe signal; and wherein the transmitting comprises selecting to output to the bus new information from the information source instead of information previously provided to the bus.

9. A method for synchronizing a transmission of information over a bus, the method comprises:

receiving, by a bus transmitter circuit that is controlled by a bus transmitter control circuit, information provided by an information source, transmitting, by the bus transmitter circuit to a bus receiver circuit controlled by a bus receiver control circuit, the information over the bus, and providing, by the bus receiver circuit, the transmitted information to an information target; wherein the information source and the information target are mutually asynchronous; monitoring a value of a feedback signal provided to the bus transmitter control circuit by the bus receiver control circuit; selectively enabling, by the bus transmitter control circuit, the transmitting of information in response to a change in a value of the feedback signal; monitoring a value of a delayed strobe signal provided to the bus receiver control circuit by a delay unit and selectively enabling the providing of the transmitted information to the information target in response to a change in a value of the delayed strobe signal; providing to the bus transmitter circuit a bus transmitter clock signal and providing to the bus receiver circuit a bus receiver clock signal; and wherein the bus transmitter clock signal is faster than the bus receiver clock signal and wherein the transmitting comprises transmitting new information every bus receiver clock cycle.

10. A method for synchronizing a transmission of information over a bus, the method comprises:

receiving, by a bus transmitter circuit that is controlled by a bus transmitter control circuit, information provided by an information source, transmitting, by the bus transmitter circuit to a bus receiver circuit controlled by a bus receiver control circuit, the information over the bus, and providing, by the bus receiver circuit, the transmitted information to an information target; wherein the information source and the information target are mutually asynchronous; monitoring a value of a feedback signal provided to the bus transmitter control circuit by the bus receiver control circuit; selectively enabling, by the bus transmitter control circuit, the transmitting of information in response to a change in a value of the feedback signal; monitoring a value of a delayed strobe signal provided to the bus receiver control circuit by a delay unit and selectively enabling the providing of the transmitted information to the information target in response to a change in a value of the delayed strobe signal; providing to the bus transmitter circuit a bus transmitter clock signal and providing to the bus receiver circuit a bus receiver clock signal; and wherein the bus transmitter clock signal and the bus receiver clock signal are characterized by substantially the same frequency and wherein the transmitting comprises transmitting new information every two bus receiver clock cycles.

11. The device according to claim 1 wherein the bus transmitter circuit comprises multiple multiplexers that select whether to send to the bus new information from the information source or information previously provided to the bus.

12. The method according to claim 6 wherein the transmitting comprises selecting to output to the bus new information from the information source instead of information previously provided to the bus.

* * * * *